United States Patent
Vega et al.

(10) Patent No.: US 11,552,867 B1
(45) Date of Patent: Jan. 10, 2023

(54) SYSTEM, DEVICE, AND METHOD OF CLASSIFYING ENCRYPTED NETWORK COMMUNICATIONS

(71) Applicant: ALLOT LTD., Hod HaSharon (IL)

(72) Inventors: Jose Maria Vega, Toledo (ES); Marina Ascension Igual Lopez, Madrid (ES)

(73) Assignee: ALLOT LTD, Hod Hasharon (IL)

(*) Notice: Subject to any disclaimer, the term of this patent is extended or adjusted under 35 U.S.C. 154(b) by 0 days.

(21) Appl. No.: 17/382,386

(22) Filed: Jul. 22, 2021

(51) Int. Cl.
| | |
|---|---|
| *H04L 43/062* | (2022.01) |
| *G06N 3/08* | (2006.01) |
| *G06K 9/62* | (2022.01) |
| *G06N 3/04* | (2006.01) |
| *H04L 67/02* | (2022.01) |
| *H04L 43/0894* | (2022.01) |
| *H04L 43/0817* | (2022.01) |

(52) U.S. Cl.
CPC .......... *H04L 43/062* (2013.01); *G06K 9/628* (2013.01); *G06N 3/04* (2013.01); *G06N 3/08* (2013.01); *H04L 43/0817* (2013.01); *H04L 43/0894* (2013.01); *H04L 67/02* (2013.01)

(58) Field of Classification Search
CPC .......... H04L 67/02; H04L 43/062; G06N 3/08
See application file for complete search history.

(56) References Cited

U.S. PATENT DOCUMENTS

| | | | |
|---|---|---|---|
| 10,986,001 B2 * | 4/2021 | Guo | H04L 43/04 |
| 2007/0088845 A1 * | 4/2007 | Memon | H04L 47/10 |
| | | | 709/234 |

* cited by examiner

*Primary Examiner* — Minh Chau Nguyen
(74) *Attorney, Agent, or Firm* — Browdy and Neimark, PLLC

(57) ABSTRACT

Systems, devices, and methods of classifying encrypted network communications. A Traffic Monitoring Unit operates to monitor network traffic, and to capture HTTPS-encrypted packets that are exchanged over an HTTPS connection between an end-user device and a web server. An HTTPS Traffic Classification Unit operates to detect discrete HTTPS-encrypted objects within that HTTPS connection, and to classify those discrete HTTPS-encrypted objects based on at least one of: a first Analysis Model that classifies HTTPS-encrypted objects based on a type of content that is represented in the HTTPS-encrypted object; a second Analysis Model that classifies HTTPS-encrypted objects based on a type of server-side application that is associated with the HTTPS-encrypted object. Each Analysis Model utilizes Machine Learning (ML), Deep Learning (DL), Artificial Intelligence (AI), or Statistical and Mathematical Analysis (SMA).

11 Claims, 8 Drawing Sheets

| | Prob 0 Objs | Prob 1 Objs | Prob 2 Objs | Prob 3 Objs | Prob 4 Objs | Prob 5 Objs |
|---|---|---|---|---|---|---|
| 1st Time Serie – Pkt 1 → Pkt 5 | 0.1 | 0.2 | 0.1 | 0.3 | 0.1 | 0.2 |
| 2nd Time Serie – Pkt 2 → Pkt 6 | 0.0 | 0.0 | 0.1 | 0.9 | 0.0 | 0.0 |
| 3rd Time Serie – Pkt 3 → Pkt 7 | 0.0 | 0.1 | 0.9 | 0.0 | 0.0 | 0.0 |
| 4th Time Serie – Pkt 4 → Pkt 8 | 0.1 | 0.8 | 0.1 | 0.0 | 0.0 | 0.0 |
| 5th Time Serie – Pkt 5 → Pkt 9 | 0.8 | 0.1 | 0.1 | 0.0 | 0.0 | 0.0 |
| ... | | | | | | |
| 3rd Time Serie – Pkt 9 → Pkt 14 | 0.0 | 0.8 | 0.0 | 0.1 | 0.0 | 0.1 |

SYSTEM, DEVICE, AND METHOD OF CLASSIFYING ENCRYPTED NETWORK COMMUNICATIONS

FIELD

Some embodiments are related to the field of communication networks.

BACKGROUND

Electronic devices and computing devices are utilized on a daily basis by millions of users worldwide. For example, laptop computers, desktop computers, smartphone, tablets, and other electronic devices are utilized for browsing the Internet, consuming digital content, streaming audio and video, sending and receiving electronic mail (email) messages, Instant Messaging (IM), video conferences, playing games, or the like.

SUMMARY

Some embodiments provide systems, devices, and methods for classification of encrypted network communications; and particularly, for classification of encrypted Internet traffic and HTTPS traffic.

In some embodiments, a system comprises: (a) a Traffic Monitoring Unit, to monitor network traffic, and to capture HTTPS-encrypted packets that are exchanged over an HTTPS connection between an end-user device and a web server; and (b) an HTTPS Traffic Classification Unit, to detect discrete HTTPS-encrypted objects within said HTTPS connection, and to classify said discrete HTTPS-encrypted objects based on at least one of: (b1) a first Analysis Model that classifies HTTPS-encrypted objects based on a type of content that is represented in said HTTPS-encrypted object, by using at least one of: Machine Learning (ML), Deep Learning (DL), Artificial Intelligence (AI), Statistical and Mathematical Analysis (SMA); (b2) a second Analysis Model that classifies HTTPS-encrypted objects based on a type of server-side application that is associated with said HTTPS-encrypted object, by using at least one of: Machine Learning (ML), Deep Learning (DL), Artificial Intelligence (AI), Statistical and Mathematical Analysis (SMA).

Some embodiments may provide other and/or additional advantages and/or benefits.

BRIEF DESCRIPTION OF THE DRAWINGS

FIG. 4 is a schematic illustration demonstrating a set of time series and their corresponding packets, together with the probability values for the possible number of Objects in each of the time series, as may be generated and utilized in accordance with some embodiments.

DETAILED DESCRIPTION OF SOME DEMONSTRATIVE EMBODIMENTS

Figure 1:
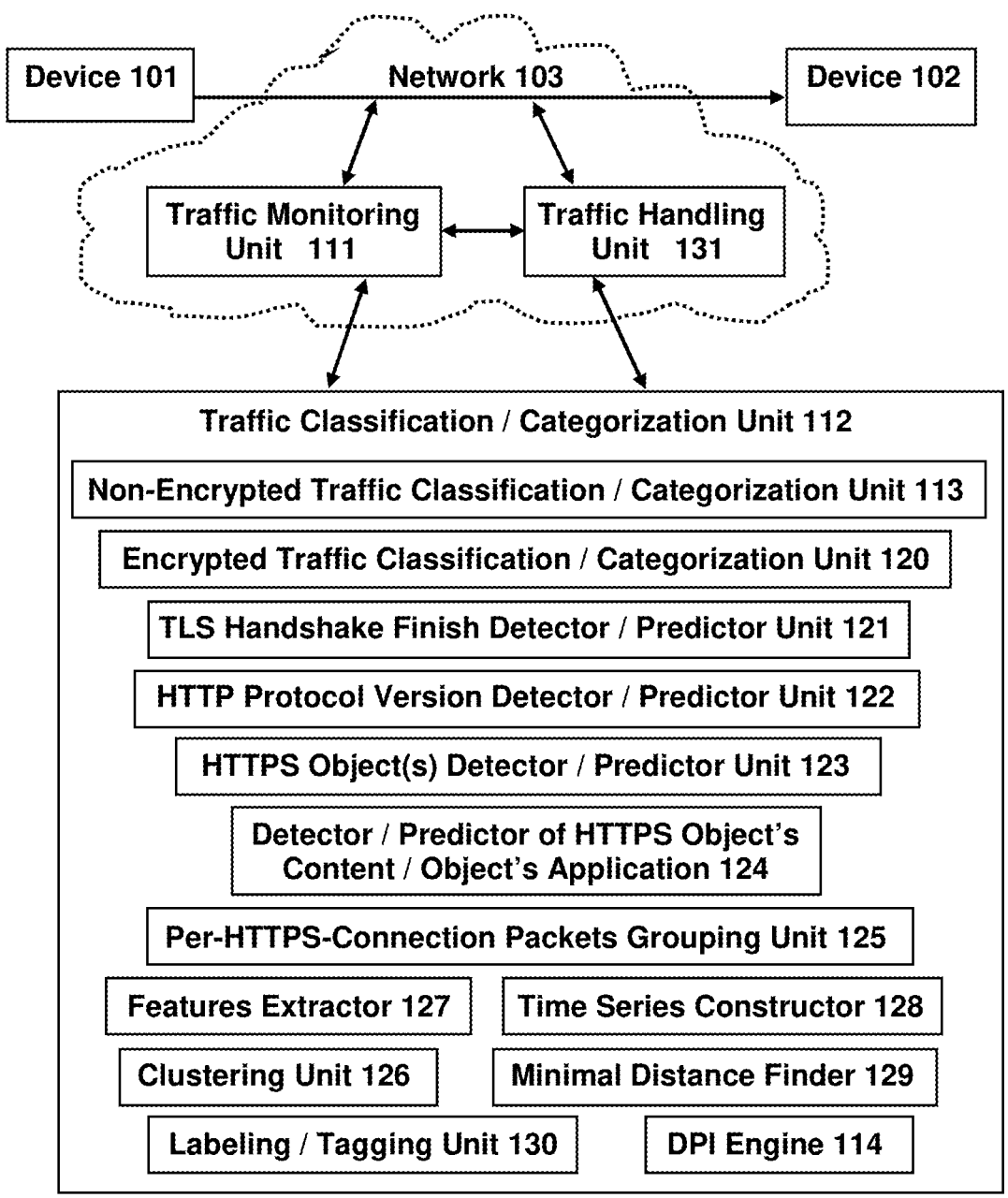
FIG. 1 is a schematic block diagram illustration of a system configured to perform classification or categorization of encrypted/HTTPS traffic, in accordance with some demonstrative embodiments.

Some embodiments include systems, devices, and methods of protecting Internet-connected devices against fraudulent and malicious activities.

The Applicants have realized that HTTPS communications encrypt the payload data that is exchanged between two entities, such as between an end-user-device and a server (e.g., of a website). Such encrypted data cannot be unencrypted by a third-party. Therefore, HTTPS encrypted data cannot typically benefit from one or more services, or traffic-related policies, that are based on (or that take into account) data classification, or that rely on knowledge which application is associated with the encrypted data, or that rely on knowledge which type of data is being sent or received or exchanged (e.g., Internet browsing data; streaming video; streaming audio; live video conference; live audio conference; a download of a large file; a real-time gaming activity; or the like). For example, it may be beneficial to prioritize the transport or the delivery of HTTPS data that belongs to a real-time video conference application, relative to the transport or the delivery of HTTPS data that belongs to static HTML content of a news article that the user reads slowly on this device.

The Applicants have realized that traffic classification or traffic categorization, which is a process to classify or to categorize network traffic into one (or more) of several classes or categories (e.g., depending on various parameters), may be beneficial and sometimes required for proper or improved traffic management, traffic charging, Service Level Management, traffic prioritization, traffic steering or routing or re-routing, traffic shaping, traffic constraining, selecting to apply (or, selecting not to apply) a traffic quota or a traffic limit or a traffic constraint or a traffic filter, allocating or re-allocating or dividing bandwidth, allocating or re-allocating network resources, and/or performing other network management operations and/or traffic handling operations.

The Applicants have realized a conventional method for classification of non-encrypted HTTP traffic, which inspects the non-encrypted payload of a packet and searches for keywords or strings that are typical to a particular category or application, cannot be utilized in conjunction with encrypted/HTTPS traffic, since the payload is encrypted.

The Applicants have realized that an attempt to rely on Server Name Indication (SNI) based filtering for the purpose of traffic classification may also fail or be incorrect. For example, multiple services of the same entity may serve or may utilize different types of content; for example, Facebook's Whiteboard service (collaborative drawing) and Facebook's Live (or Live Video) service (real-time video sharing) serve and utilize different types of content, but have the same SNI. Furthermore, realized the Applicants, some SNI data may be encrypted (ESNI), such as by TLS 1.3 protocol extension.

Some embodiments of the present invention may perform behavioral classification or behavior-based classification of network traffic, and particularly of encrypted/HTTPS network traffic. For example, an HTTPS traffic classification system may monitor and examine traffic patterns of encrypted network traffic, and may identify or extract or recognize different particular patterns (or, different clusters of data-points) which correspond to different pre-defined data categories or data classes. Such classifier unit(s) may utilize several measurements or statistics at the flow level, and may apply Machine Learning (ML) or Deep Learning (DL) or other Artificial Intelligence (AI) algorithms or Statistical/Mathematical Algorithms (SMAs) to find the category or the class of traffic depending on these measures. The term "ML/DL/AI/SMA" as used herein, by itself or in conjunction with a "unit" or a "processor" or a "model" or an "analysis" or other operation(s), may include any relevant type or combination of such ML unit or process and/or DL unit or process and/or AI unit or process and/or SMA unit or process; and similarly, any reference above or herein to ML or to DL or to AI or to SMA may optionally include one or more (or some, or all) of such ML/ DL/AI/SMA units or processes or operations or models.

Some embodiments may provide an encrypted data classification system which may include one or more (or all) of the following features: (a) classification of encrypted/ HTTPS network traffic into classes or categories, and/or detection of a particular application that is associated with a particular data-packet or with a particular set or flow of data packets; (b) achieving such classification without attempting to decrypt or to "crack" the payload (e.g., by password guessing, by brute-force attacks, by side-channel attacks, or the like), and/or without having actual access (before classification, during classification, and/or after classification) to the payload itself in its non-encrypted form; (c) performing classification of encrypted traffic independently of the content visibility, and without relying on having access to a non-encrypted version or format of the payload being transported; (d) performing a fine-grained or fine-tuned or high-resolution or high-granularity categorization or classification, in order to enable better selection of appropriate and precise traffic management operations, including the detection of differences at the application level; (e) performing data classification in a highly accurate manner and a reliable manner that are suitable for real-time or near-real-time traffic classification, and that can efficiently operate on encrypted/ HTTPS traffic "in the wild" or in an actual real-world network at scale, and not only in a small-sized controlled environment in a testing lab; (f) being resilient to the deepest or strongest level of encryption, including payload encryption and/or handshake encryption of virtually any type, and performing classification of encrypted traffic by relying (e.g., exclusively) on extracted statistics; (g) being a flexible and adaptable method, that would not suffer from temporal or spatial obsolescence, and that would automatically and dynamically adapted to changes in traffic and/or in traffic patterns, and that would be able to correctly classify a new type of data (or, to classify data that is associated with a new application) without being limited to a pre-defined closed list of already-known and named applications.

Some embodiments may operate to detect objects inside an HTTPS connection and to classify them. After the object detection, the classification may be performed at two levels: (I) Differentiate among objects based on their content type (e.g., images, HTML files, text files, or the like); (II) Differentiating among objects based on their application type (e.g., HTML data exchanged with Amazon.com, HTML data exchanged with Google, HTML data exchanged with CNN.com, or the like).

In some embodiments, at any time, when an end-user device requests a web-page, the contacted web-server to the end-user device a copy of the requested web-page as a collection of objects transported over packets. The objects are elements of the web-page and they typically includes text, graphics, links, scripts, embedded video, or the like. The browser on the end-user devices fetches the objects by sending associated requests to the web-server. Upon receiving the objects from the web-server, the browser on the end-user device re-assembles the web-page by parsing and/ or ordering the objects, and displays to the end-user the re-assembled web-page.

For non-encrypted/HTTP traffic, a classification system is able to find the particular packet where an object starts, the particular packet where the object ends, and the particular packets that correspond to the content of the object. However, for encrypted/HTTPS traffic, the classification system may only observe and monitor the length of the packet and other parameters or meta-data, but not the actual content. Additionally, for encrypted/HTTPS traffic, it is not clear in which packet an object starts, in which the object ends, which packets exactly correspond to a particular object, and how many objects in total are sent as part of a single web-page.

Some embodiments of the present invention may operate to detect and identify the packets that are forming a website object. The system may include a chain or a set of models (e.g., ML models, DL models, AI models, SMA models) that detect where (e.g., at which packet) an object starts and where (e.g., at which packet) the object ends; and based on these insights, the system may calculate and utilize several different metrics and statistics for each such detected object.

In accordance with some embodiments, different types of traffic demonstrate or exhibit different behaviors when their corresponding objects are transported over HTTPS objects; such that detection of a particular behavior may be indicative of a particular type of object or content or traffic or application. Then, depending on the server from which the objects are being served, the metrics of each detected object would also be also different. Furthermore, a group of servers providing similar content type, such as applications of streaming videos (e.g., YouTube.com, Twitch.com, DailyMotion.com, or the like) exhibit the same metrics for their respective objects. As a result, different websites can be grouped by the metrics characterizing their objects, and this can be used by the system to perform traffic classification or categorization even for encrypted/HTTPS traffic.

Accordingly, the classification system identifies objects that are inside an HTTPS stream, regardless of the data encryption method being used. After identifying the objects, different indicators and statistics are calculated for each detected object. Then, using a set of traffic metrics, objects can be classified by their application, content type, protocol type, and/or other types of categories or classes.

For demonstrative purposes, some portions of the discussion above or herein may relate to HTTPS traffic or to HTTPS packets; however, this is only a non-limiting example of encrypted traffic or encrypted packets (respectively); and some embodiments may similarly be used with other (e.g., non-HTTPS) types of encryption or encrypted traffic or encrypted packets.

Reference is made to FIG. 1, which is a schematic block diagram illustration of a system 100 able to perform classification or categorization of encrypted/HTTPS traffic, in accordance with some demonstrative embodiments. For example, a first device 101 is communicating over a network 103 with a second device, particularly via an encrypted communication link or over HTTPS. For example, device 101 may be an end-user device (e.g., smartphone, tablet, laptop computer, desktop computer, or the like), and device 102 may be a server (e.g., a Web server, an applications server, a cloud-computing server, or the like). In some embodiments, devices 101 and 102 may be two end-user devices that communicate between them securely over an HTTPS link. In other embodiments, devices 101 and 102 may be two servers, or two other entities, that communicate between them securely over an HTTPS link. In some embodiments, device 101 may be a "client" side device that operates mainly to receive and consume content, whereas device 102 may be a "server" side device that operates mainly to serve content.

Network 103 may be or may include, for example, a wireless communication network, a wired network, a fiber optics network, a Wi-Fi network, a cellular communication network, an Internet Service Provider (ISP) network, a Cellular Service Provider (CSP) network, or a collection or a chain of two or more such networks, which may be of the same type or of different types.

In accordance with some embodiments, a Traffic Monitoring Unit 111 is part of network 103, or is operably associated with network 103; and operates to monitor, or to listen to, or to intercept, or to relay, or to replicate, traffic that is transported or exchanged over (or through, or within) network 103 between device 101 and device 102. In some embodiments, Traffic Monitoring Unit 111 is connected within network 103, or at (or near) an entry node of network 103, or at (or near) an entry node of network 103, or at (or near) a communications exit point from device 101, or at (or near) a communications entry point of device 101, or at (or near) a communications exit point from device 102, or at (or near) a communications entry point of device 102; or at other suitable communication segment that connects device 101 to device 102; or at a router or switch or hub or relay unit that routes or transmits or relays traffic between device 101 and device 102. In some embodiments, Traffic Monitoring Unit 111 is deployed as an in-line network element or an in-line network node. In other embodiments, Traffic Monitoring Unit 111 is deployed in parallel to the communication segment that connects devices 101 and 102, operating in tap mode or as a network tap element. In some embodiments, Traffic Monitoring Unit 111 intercepts traffic, or monitors traffic, or listens to traffic, or collects traffic, or duplicates or replicates traffic for monitoring and for classification or categorization. The monitored traffic may include packets, data packets, outgoing traffic, incoming traffic, outbound traffic, inbound traffic, payload, headers, meta-data of packets (e.g., origin, destination, packet number, packet size, timestamp), TCP/IP traffic, HTTP traffic, HTTPS traffic, FTP traffic, and/or other types of traffic. In some embodiments, Traffic Monitoring Unit 111 collects or gathers traffic (e.g., packets), and replicates them with their respective timestamps; and stores them towards further analysis by other components of system 100.

In some embodiments, Traffic Monitoring Unit 111 collects and provides traffic (e.g., packets, sets of packets, groups of packets, streams of packets, meta-data of packets or about packets, time-stamps, and/or other collected data) to a Traffic Classification/Categorization Unit 112, which analyzes the traffic and performs traffic classification or traffic categorization; for example, into types (or classes, or categories) of traffic, or into types (or classes, or categories) of websites that are accessed or visited. Traffic Classification/Categorization Unit 112 may include a Non-Encrypted Traffic Classification/Categorization Unit 113, which classifies or categorizes non-encrypted traffic (e.g., HTTP traffic); for example, by detecting pre-defined keywords or strings that appear in packet headers or in packets, and/or by applying Deep Packet Inspection (DPI) analysis by a DPI Engine 114 or a DPI unit. Traffic Classification/Categorization Unit 112 further includes an Encrypted Traffic Classification/Categorization Unit 120, which classifies or categorizes encrypted traffic (e.g., HTTPS traffic), based on one or more methods that are discussed above and/or herein.

In a demonstrative embodiment, the Encrypted Traffic Classification/Categorization Unit 120 may utilize a set or a chain or a group of several models, such as a chain of four models, to analyze a stream of packets that belong to the same single HTTPS connection, to detect objects inside the packet stream, to extract the objects from the packet stream, and to analyze and identify the extracted objects. For example, a Transport Layer Security (TLS) Handshake Finish Detector/Predictor Unit 121 may utilize an ML/DL/AI/SMA model to detect or to predict a TLS handshake finish; an HTTP Protocol Version Detector/Predictor Unit 122 may utilize a statistical model to detect or to predict the HTTP protocol version; an Object(s) Detector/Predictor Unit 123 may utilize an ML/DL/AI/SMA model to detect or predict object(s) in the HTTPS packet stream; a Detector/Predictor of Object's Content/Object's Application 124 may utilize an ML/DL/AI/SMA model to detect or predict the object's content and/or the object's application. In some embodiments, for a browsing session that includes several HTTPS connections, the method is performed for each HTTPS connection separately.

Initially, packets are separated or grouped together based on the connection to which they belong; such that only the packets that correspond to (or belong to) the same HTTPS connection are passed for further analysis, or are grouped together and fed as input for the analysis of that particular HTTPS connection. These operations may be performed by a Per-HTTPS-Connection Packets Grouping Unit 125, or by other unit that groups together only the packets that are associated with the same HTTPS connection. Additional units may be included and utilized, to perform one or more operations or processes that are described above and/or herein; for example, a Features Extractor Unit 127 may extract features, particularly traffic features or traffic-related features, of each object that is detected or predicted within a particular HTTPS connection, and may generate a vector or set or group of such extracted features per HTTPS object. A Time Series Constructor Unit 128 may collect or construct timer series from a plurality of N such vectors of extracted features (for example, N being 5, or other suitable pre-defined value). A Clustering Unit 126 may perform clustering of packets or objects (or, groups of packets, or groups of objects) into clusters, each cluster corresponding to a particular content type, or each cluster corresponding to particular application (or, a particular application type) that is associated with an object. A Minimal Distance Finder Unit 129 may assist the Clustering Unit 126, or may be part thereof or may be operably associated therewith, and may calculate and find the minimal total distance between (i) the values of the traffic features of a particular object detected in an HTTPS connection, and (ii) the average value(s) of corresponding traffic features of each Cluster that is known to correspond to a particular content-type or to a particular application-type.

Based on the classification of objects that are detected in HTTPS connection(s), the system may utilize a Labeling/Tagging Unit 130 to label or to tag an item (e.g., a packet; an HTTPS packet; an encrypted packet; a set or group of HTTPS packets or encrypted packets; an object; an object detected within a particular HTTPS connection; a set of objects, or all the objects, of a particular HTTPS connection) with a label or a tag that indicates, for example, a Content Type of that item (e.g., audio, video, image, text, JavaScript, or the like) and/or an Application that is associated with that item (e.g., Zoom, Skype, Firefox, or the like) and/or an Application-Type that describes a type of application that is associated with that item (e.g., streaming video type of application; streaming audio type of application; image editing application; word processing application; banking application; or the like). The labels or tags that are assigned, to an HTTPS connection and/or to its object(s) and/or to its packets, may be used in real time or in near real time by a Traffic Handling Unit 131, which may perform one or more suitable operations of traffic handling; for example, traffic routing or re-routing, traffic quarantining, traffic delaying, traffic prioritizing, modifying or setting or enforcing a bandwidth constraint, traffic quota modification or enforcement, traffic shaping, traffic steering, load balancing, traffic discarding, traffic modification or replacement, and/or other suitable operations based on pre-defined traffic handling rules. For example, a traffic handling rule may indicate that an HTTPS connection that is determined to be associated with a particular application (e.g., Zoom video conferencing) would be assigned or allocated a higher priority and/or greater bandwidth and/or would be routed through communication route A; whereas, an HTTPS connection that is determined to be associated with another particular application (e.g., CNN application for reading news articles) would be assigned or allocated a reduced priority and/or lower bandwidth and/or would be routed through communication route B. Similarly, another traffic handling rule may indicate that an HTTPS object that is determined to be of a particular content type (e.g., JavaScript code) would be assigned or allocated a higher priority and/or greater bandwidth and/or would be routed through communication route A; whereas, another HTTPS object that is determined to be of another particular content type (e.g., CSS) would be assigned or allocated a reduced priority and/or lower bandwidth and/or would be routed through communication route B. Other suitable rules may be defined and enforced.

Figure 2:
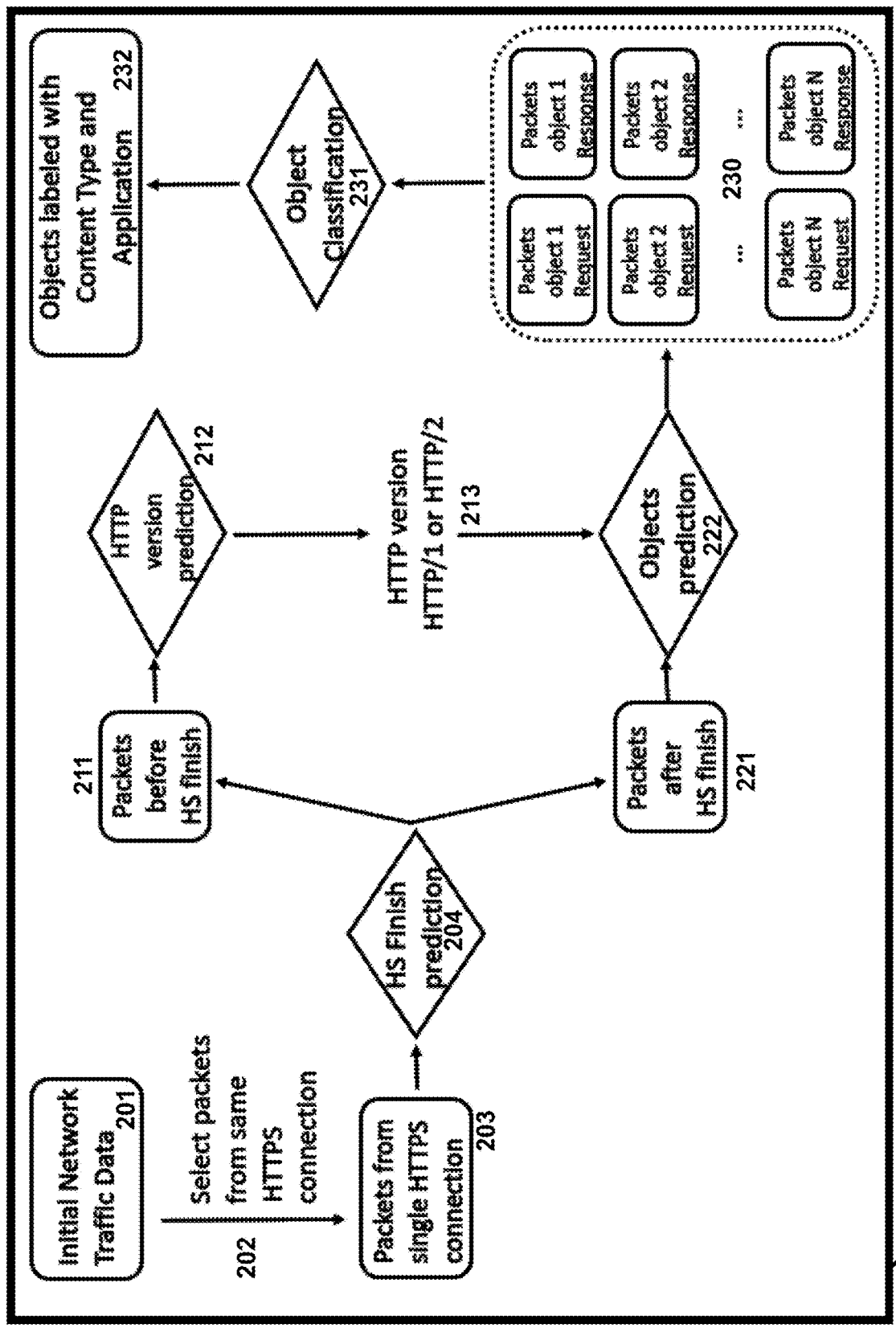
FIG. 2 is a schematic illustration of a chart of operations that may be performed in accordance with some embodiments.

Reference is made to FIG. 2, which is a schematic illustration of a chart 200 of operations that may be performed in accordance with some embodiments. For example, initial network traffic data is obtained (block 201); for example, traffic packets are received or monitored or captured or replicated or duplicated or intercepted for analysis. Packets are selected or grouped or collected (arrow 202) based on their belonging to an HTTPS connection, such that all the packets—and only those packets—which belong to (or are part of, or are associated with) a particular HTTPS connection are grouped into the same single group or collection of packets (block 203). The group of packets that belong to a single HTTPS connection now undergoes TLS Handshake Finish Detection/Prediction (block 204). For example, packets of that HTTPS connection that are before the TLS handshake finish (block 211), undergo HTTP version prediction (block 212) which detects or determines the HTTP version (block 213), such as HTTP/1 or HTTP/2, and the HTTP version is then fed to the object prediction process (of block 222). Conversely, packets that follow the TLS handshake finish (block 221) undergo the object prediction process (block 222), which generates a set (block 230) of packets per object request (from 1 through N objects, on a per-object basis) and their corresponding packets per object response (from 1 through N objects, on a per-object basis). The set of grouped packets per object request and grouped packets per object response, are used for object classification (block 231), which enables the labeling or tagging or marking of each object (or, in some embodiments, a set of objects) with a label or tag that indicates content type and/or application and/or application-type that is (or are) associated with that object (or, in some embodiments, with that set of objects).

Returning now to FIG. 1, the TLS Handshake Finish Detector/Predictor Unit 121 may utilize an ML/DL/AI/SMA model to detect or to predict a TLS handshake finish or TLS handshake Finish Message(s), from both the client side and the server side, which in turn point to the beginning of data exchange between the two sides.

In a demonstrative embodiment, the TLS Handshake Finish Detector/Predictor Unit 121 extracts, analyzes and/or uses the following features, or at least some of them, per each packet: (A) The Packet Direction, represented as a binary variable, indicating where the packet came from; for example, value of "1" indicates that the packet came from (was sent by) the client side, whereas value of "0" indicates that the packet came from (was sent by) the server side. (B) The number of TLS records with content type having value of "20", as this content type indicates that the encapsulated data contains at least a portion that is in accordance with Change Cipher Spec protocol. (C) The number of TLS records with content type value of "21", as this content type indicates that the encapsulated data contains at least a portion that is in accordance with Alert Protocol. (D) The number of TLS records with content type value of "22", which indicates that the data encapsulated contains at least a portion that is in accordance with Handshake Protocol. (E) The number of TLS records with content type value of "23", which indicates that the encapsulated data contains at least a portion that is in accordance with Application Protocol. (F) The total size (e.g., in bytes) of all the TLS records in the packet. In some embodiments, if a packet does not contain any TLS records, then the values assigned to features from "B" through "F" would be "0".

Then, a CART Decision Tree (Classification and Regression Trees) algorithm is applied to predict or to estimate whether or not the given packet contains a handshake finish message. The function to measure the quality of a split is Gini impurity, and the minimum number of samples required to split an internal node is 2. This CART Decision Tree recognizes the combination of variables (from "A" to "F") that related to the packets with the "HS Finish" message. In that case, the algorithm labels the packet with a value of "1"; otherwise, the packet is not recognized as a packet with "HS Finish" message, and is thus labeled with a value of "0". In accordance with some embodiments, only one packet in each direction (in the same HTTPS session) can contain the "HS Finish" message. The results or output of the TLS Handshake Finish Detector/Predictor Unit 121 Results are the labeled packets, as described.

The HTTP Protocol Version Detector/Predictor Unit 122 operates to detect or predict the HTTP protocol version that is being used, particularly recognizing it as either HTTP/1 or HTTP/2. Both versions use TCP as transport layer, and they are the most common protocols. In contrast, HTTP/3 uses QUIC as transport layer, and has limited use (e.g., it is estimated that only about 3 percent of websites use HTTP/3). The differentiation between HTTP/1.x and HTTP/2 is utilized since, for example, depending on the HTTP protocol version, the patterns for object recognition are different. For example, HTTP/2 enables multiplexing (e.g., the client and server can send or process several HTTP requests in the same packet), and the packets' headers are compressed. The model is applied to each HTTPS connection that uses TCP as transport layer.

In accordance with some embodiments, the HTTP protocol version detection or prediction may be based on a single extracted feature: the distribution of TLS record sizes across all the packets before the "HS Finish" message. For this purpose, using all the preceding packets in the given session (e.g., all the packets that precede the "HS finish" message), the system calculates the Probability Density Function (PDF) for the TLS record sizes. The PDF may be calculated using Kernel Density Estimation (KDE), where the selected basic function is Gaussian and the bandwidth is equal to 2; or using other suitable parameters or calculation methods.

In some embodiments, the algorithm that is used to detect or predict the version of the HTTP protocol may be based on the statistical test of Kolmogorov-Smirnov (KS-test); it is a non-parametric test that compares two PDFs, and returns a statistical significance that reveals if the two PDFs come from the same distribution. The algorithm may utilize a rule that the distribution of the TLS record sizes of client-originated packets in the handshake, is statistically different for different HTTP versions. For that purpose, the KS-test compares the PDF calculated for the TLS record sizes with two Reference PDFs that were previously calculated and stored: (a) a First Reference PDF, calculated for TLS record sizes of all the client-originated packets in the TLS handshake of a large number (M) of HTTPS connections of HTTP/1 (for example, M being 100,000); (b) a Second Reference PDF, calculated for TLS record sizes of all the client-originated packets in the TLS handshake of a large number (N) of HTTPS connections of HTTP/2 (for example, N being 100,000; in some embodiments, N is equal to M; or N/M is in the range of 0.95 to 1.05, to have a large and generally similar sample size).

In order to detect or predict the HTTP version, the results of the two KS-tests are compared. Each test returns a p-value that indicates the statistical probability of two samples belonging to the same distribution. If the p-value lower than 0.05, then there is a probability smaller than 5% that the samples belong to the same distribution. The detection or prediction process selects the HTTP version with the higher p-value.

The Object(s) Detector/Predictor Unit 123 detects or predicts the number of objects inside a particular HTTPS connection, and the packets belonging to each of the objects on the client side (request for objects) and on the server side (response with objects). The unit performs encrypted traffic classification based on per-flow statistics, which may be derived from payload-independent features (e.g., packet length, inter-arrival time). These and other features may vary, depending on the application that is associated with the particular group of packets; thereby enabling to utilize per-flow statistics for identifying the objects inside an encrypted/HTTPS connection. With this identification, the packets that correspond to different objects will be separated; for example, grouping together in a first group the packets that correspond to Object-1 of a particular HTTPS connection, grouping together in a second group the packets that correspond to Object-2 of that particular HTTPS connection, and so forth for N objects; and further separating between packets that correspond to the Request or to the Response of each such numbered Object. Then, the model for traffic categorization will operate with per-object statistics, calculated from the packets separated by their object belonging, thereby enabling to achieve a high-granularity and accurate categorization level of encrypted/HTTPS traffic.

In some embodiments, prior to passing a packet to the Objects detection/prediction model, each packet undergoes a pre-processing phase which extract the following features, or at least some of them: (A) The Packet Direction, represented as a binary variable, indicating where the packet came from; for example, value of "1" indicates that the packet came from (was sent by) the client side, whereas value of "0" indicates that the packet came from (was sent by) the server side. (B) The IAT value, indicating the Interval Arrival Time of the packet in that HTTPS connection. (C) The TCP length (e.g., in bytes), indicating the number of bytes in the TCP layer of the packet. (D) The number of TLS records (in the TLS layer of the packet) with content type value of "23", which indicates that the encapsulated data contains at least a portion that is in accordance with Application Protocol. (E) The average TLS record length; indicating the average number of bytes across all the TLS records of the packet, or the average length (in bytes) of a TLS record; for example, calculating by dividing (i) the total length in bytes of all TLS records of the packet, by (ii) the total number of TLS records of that packet. (F) The standard deviation of the TLS record length; or, the distance of the TLS records length in the specific packet from the mean value of the length of all TLS records in that packet. (G) The total TLS record sizes, indicating the total number of bytes in all the TLS records in the packet.

Figure 3:
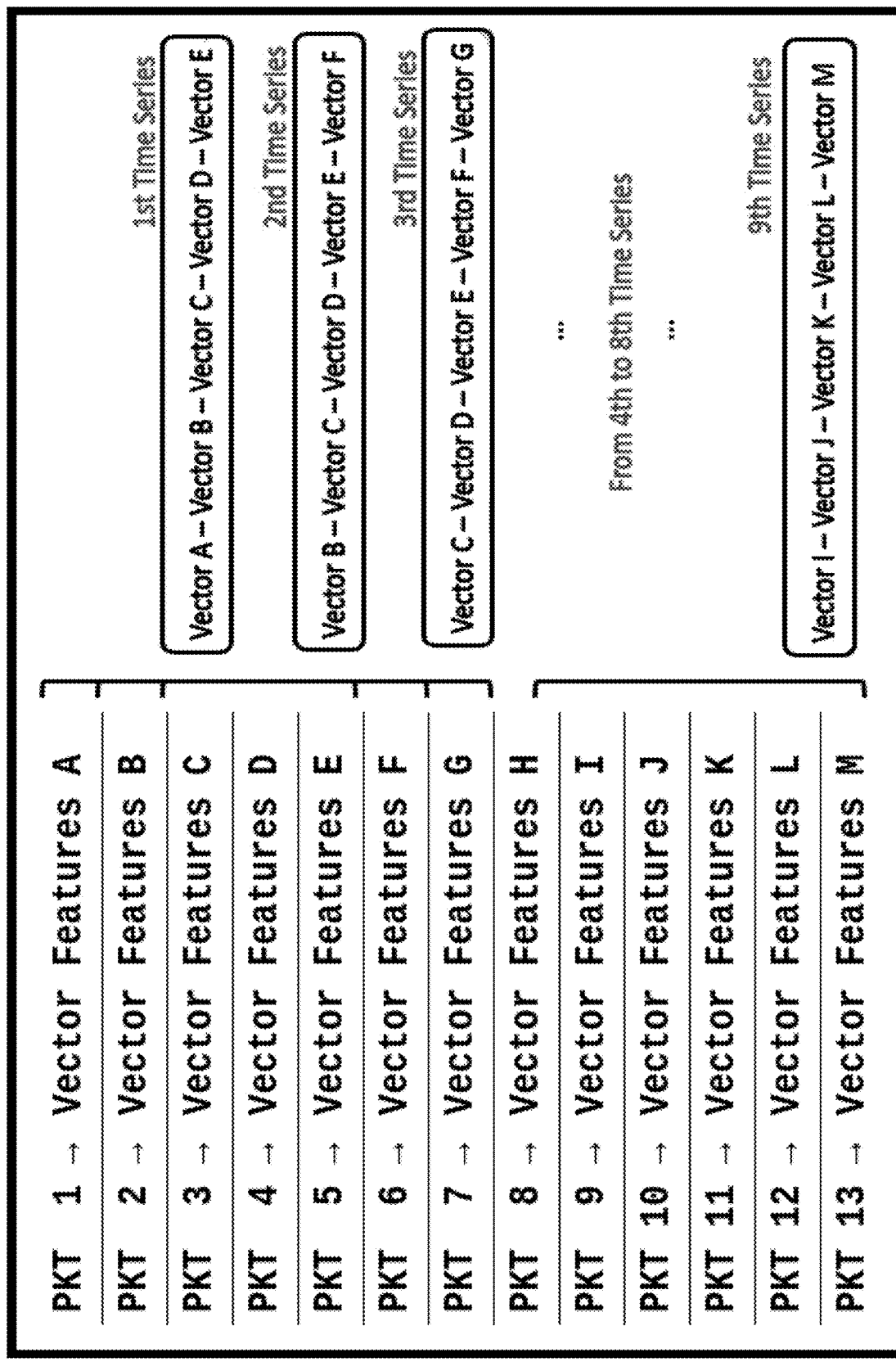
FIG. 3 is a schematic illustration demonstrating a set of vectors and temporal series, which may be generated and utilized in accordance with some embodiments.

Reference is made to FIG. 3, which is a schematic illustration demonstrating a set 300 of vectors and temporal series, which may be generated and utilized in accordance with some embodiments. For example, vectors of features for a group of N sequential packets (wherein N is a pre-defined value, such as 3 or 5 or 7 or 8 or other suitable integer) are used to create temporal series. The temporal series contain a list of N vectors for N consecutive packets (or, for N non-consecutive packets), which is going to be the data instance for each prediction or detection of the model to obtain the number of objects. At the end, a list of temporal series is obtained. Each temporal series differs by a number of packets (P packets, wherein P is a positive integer that is greater than 1) relative to the previous temporal series; for example, X may be equal to 2, and in such case the current temporal series would have 2 different vectors relevant to the previous temporal series. Accordingly, in some embodiments, the number of temporal series may be modified (e.g., non-equal to the number of packets in that HTTPS connection) depending on the specific HTTPS connection, and may be, for example, N-1 (namely, the number of packets in each temporal series, minus one).

The algorithm that is used for objects recognition inside the HTTPS connection, and for separating the packets into the different objects (with sub-division into Requests and Responses), is a Long Short-Term Memory (LSTM) recurrent neural network (RNN) for multivariate time series classification that is combined with spatial information of previously stored objects from HTTPS connections (the topology of the linked objects). The LSTM algorithm can learn from the series created with chunks of N feature vectors of N packets, and may determine how many objects there are in a block. The output of the LSTM algorithm after evaluating one instance (a group of N vectors of features for consecutively packets) would be a number in the range of 0 to N (the number of packets utilized to create the temporal series). An output of zero indicates that there are no objects in the series; an output of "1" indicates that there is one object in the series; an output of "2" indicates that there are two objects in the series; and so forth.

The algorithm can go through all series and mark the number of objects in each one. Since the difference between one series and the previous one (or the following one) is only one packet, it is possible to know which packets correspond to which objects. It is also possible to detect the packets that do not correspond to any object request and to any object response.

With regard to the specific parameters defined, the LSTM algorithm has two layers: a hidden layer having a number M of neurons (for example, M being 30 or 40 or 50 or 60 or other suitable pre-defined positive integer), and an output layer having a number R of neurons for predicting the objects number (for example, R being equal to N, which is the number of packets used to create the time series). This output layer uses a "softmax" activation function to obtain a vector with N probabilities for the number of objects; the loss function of the algorithm is a "categorical cross-entropy".

After applying the prediction model to all temporal series that belong to the same HTTPS connection, the system generates two matrices with number of rows equal to the number of temporal series (which is the number of packets in the connection), and with six columns, that are equal to the probability of having from 0 to 6 objects in the series. The first matrix represents probabilities of the different numbers of Requested Objects in each series; the second matrix represents probabilities of the different numbers of Responded Objects in each series. Using the matrices, the algorithm can determine the packets that contain either a Request for an object or a Responded object. For this comparison, the actual number of objects that is chosen in each row is the number of objects that is associated with the greater probability.

Reference is made to FIG. 4, which is a schematic illustration demonstrating a set 400 of time series and their corresponding packets, together with the probability values for the possible number of Objects in each of the time series, as may be generated and utilized in accordance with some embodiments. For example, set 400 may correspond to Object Requests; and in the example shown in it, the system may determine that each one of packets 2, 3 and 4 has a single Object Request in it.

Turning again to FIG. 1, the Detector/Predictor of Object's Content/Object's Application 124 may utilize an ML model for object classification or object categorization, and may classify each object that was detected in the HTTPS connection. In some embodiments, the following types of classification may be provided or utilized: (i) Classification that depends on the object's content type; and/or (ii) Classification that depends on the object's application. Additionally or alternatively, in some embodiments, one or more, or some, or all, of the following types of classification or categorization, may be performed or provided: (i) Classification that depends on (or that is based on) the object's content type; and/or (ii) Classification that depends on (or that is based on) the object's application (e.g., the server-side application that is associated with the object, and/or the client-side application that is associated with the object); and/or (iii) Classification that depends on (or that is based on) the object's server geo-location; and/or (iv) Classification that depends on (or that is based on) the object's user type or user-side data or user-side indicators; and/or (v) Classification that depends on (or that is based on) the object's bitrate; and/or (vi) Classification that depends on (or that is based on) the object's protocol (e.g., a protocol, or a protocol type, that is associated with the object); and/or (vii) Classification that depends on other relevant parameters of objects or other relevant object parameters. It is noted that for demonstrative purposes, some portions of the description above and/or herein, and/or some portions of the drawings, may demonstrate classification of HTTPS objects based on content-type and/or based on application; however, in some embodiments, the detected HTTPS objects may similarly be classified or categorized based on one or more other parameters or object-related properties. Additionally or alternatively, similar classification criteria and classification parameters may be used in some embodiments for classification of objects that are readily visible within non-encrypted HTTP traffic, without the need to perform the object prediction/detection process for such non-encrypted HTTP traffic.

In accordance with some embodiments, a group of packets that is associated with the requests and the responses of each detected object, is used for ML-based object classification; since behavior-related patterns of network traffic may be mapped to a content type or may be indicative of a particular content type or of a particular associated application. It is noted that in some embodiments, the relationship between behavior patterns and content type is not necessarily direct and clear for HTTPS traffic, as several objects can be transmitted concurrently.

In addition, each application may use one or more encryption techniques to encode and transmit the object; for example, a part of data chunk per time unit, or data chunk per packets, or other scheme. Analyzing patterns inside objects may be an effective way to separate the traffic according to specific application. Thus, the objects that are detected inside an HTTPS connection, have several traffic parameters that are specific for the particular associated application; for example, the number of bytes per packet, the split rate of data across packets, or the like. Therefore, objects that exhibit the same traffic patterns, may be determined to be belonging to the same application. The system may use a database of previously labeled objects and their respective applications, and may identify or detect the application of unlabeled objects, by comparing (i) traffic patterns of detected objects that require classification, with (ii) known traffic patterns as stored in the database.

In some embodiments, some or all of the following 21 features may be extracted and used, for classification of objects in an HTTPS connection: (a) Minimum forward packet length; (b) Mean forward packet length; (c) Maximum forward packet length; (d) Standard deviation of forward packet length; (e) Minimum backward packet length; (f) Mean backward packet length; (g) Maximum backward packet length; (h) Standard deviation of backward packet length; (i) Minimum forward inter-arrival time; (j) Mean forward inter-arrival time; (k) Maximum forward inter-arrival time; 1) Standard deviation of forward inter-arrival times; (m) Minimum backward inter-arrival time; (n) Mean backward inter-arrival time; (o) Maximum backward inter-arrival time; (p) Standard deviation of backward inter-arrival times; (q) Duration of the flow; (r) Number of packets in forward direction; (s) Number of bytes in forward direction; (t) Number of packets in backward direction; (u) Number of bytes in backward direction. In some embodiments, the packets from client to server direction in the object are used to calculate the forward variables; whereas, the packets from server to client direction in the object are used to calculate the backward variables. The above-mentioned list of 21 features per object (or, a subset of those 21 features; or, a similar set of traffic-related features per object) may be referred to herein as "Traffic Features" or "Object's Features" or "Object Features" or "Object's traffic features", and may be used or re-used for classification or clustering of the object's Content Type and/or the object's Application Type, as described further herein.

In some embodiments, the algorithm used to determine both the object's content type and the object's application type may be, for example, a modified version of a K-means clustering method, adapted to a semi-supervised clustering problem. For its initialization, the algorithm may use labeled examples in order to build or to define or to construct the initial prototypes and to constrain the model, such that the labeled examples are always part of any one of the initial clusters.

In some embodiments of the model, there are two classification processes for each object: Object's content type classification, and Object's application classification. Two algorithms may be used: a first algorithm initialized with data that corresponds to objects that are labeled by content type, and a second algorithm initialized with data that corresponds to objects that are labeled by application. Accordingly, the hybrid system may be able to classify objects according to their content and/or application.

Each object that was detected in the HTTPS connection, with the list of traffic features detailed above, may undergo two processes to obtain the most precise classification: (i) Clustering against a first database with object labels that depend on content type; and separately, (ii) Clustering against a second database with object labels that depend on the associated application (or the application-type, in some implementations).

Figure 5:
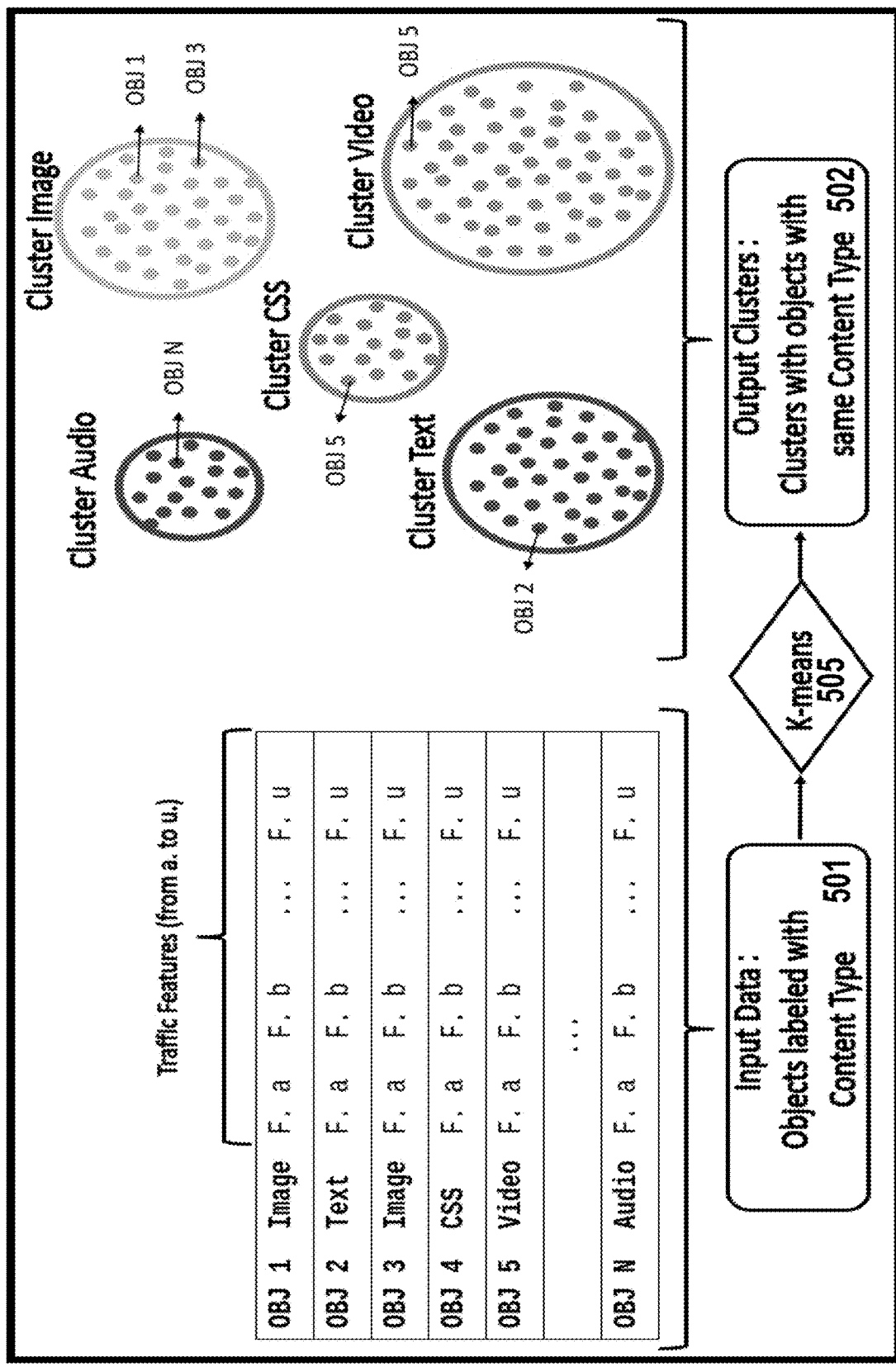
FIG. 5 is a schematic illustration demonstrating a set of objects and their respective content-based clusters, as may be generated and utilized in accordance with some embodiments.

Reference is made to FIG. 5, which is a schematic illustration demonstrating a set 500 of objects and their respective content-based clusters, as may be generated and utilized in accordance with some embodiments. Input data 501 includes objects that were pre-labeled based on object's content type (e.g., audio, video, text, image, CSS, or the like). The clustering process or the clustering unit (505) is a modified version of K-means clustering with semi-supervised initial clustering based on pre-labeled examples. Its output is output clusters 505, such that each cluster is a cluster of objects having the same content type.

The object's content type classification utilizes an initial database of objects that are pre-labeled with their respective content type. The list of possible content types of object content types may be summarized into groups such as, for example, the following nine content types: audio, video, text, compressed data, image, CSS, HTML, JavaScript, unknown content type. Therefore, for each object, there are a list of features (e.g., one of the list of features mentioned above) and a label indicating the content type of that object (e.g., one of the nine content types, in this example). This data is used in a K-means clustering process to obtain clusters, such that all the objects in each cluster have the same content type.

In some embodiments, since these object clusters are created with a K-means algorithm that uses the traffic features as the input variables, these objects clusters are groups of objects with only one content type and also with very similar traffic features.

Figure 6:
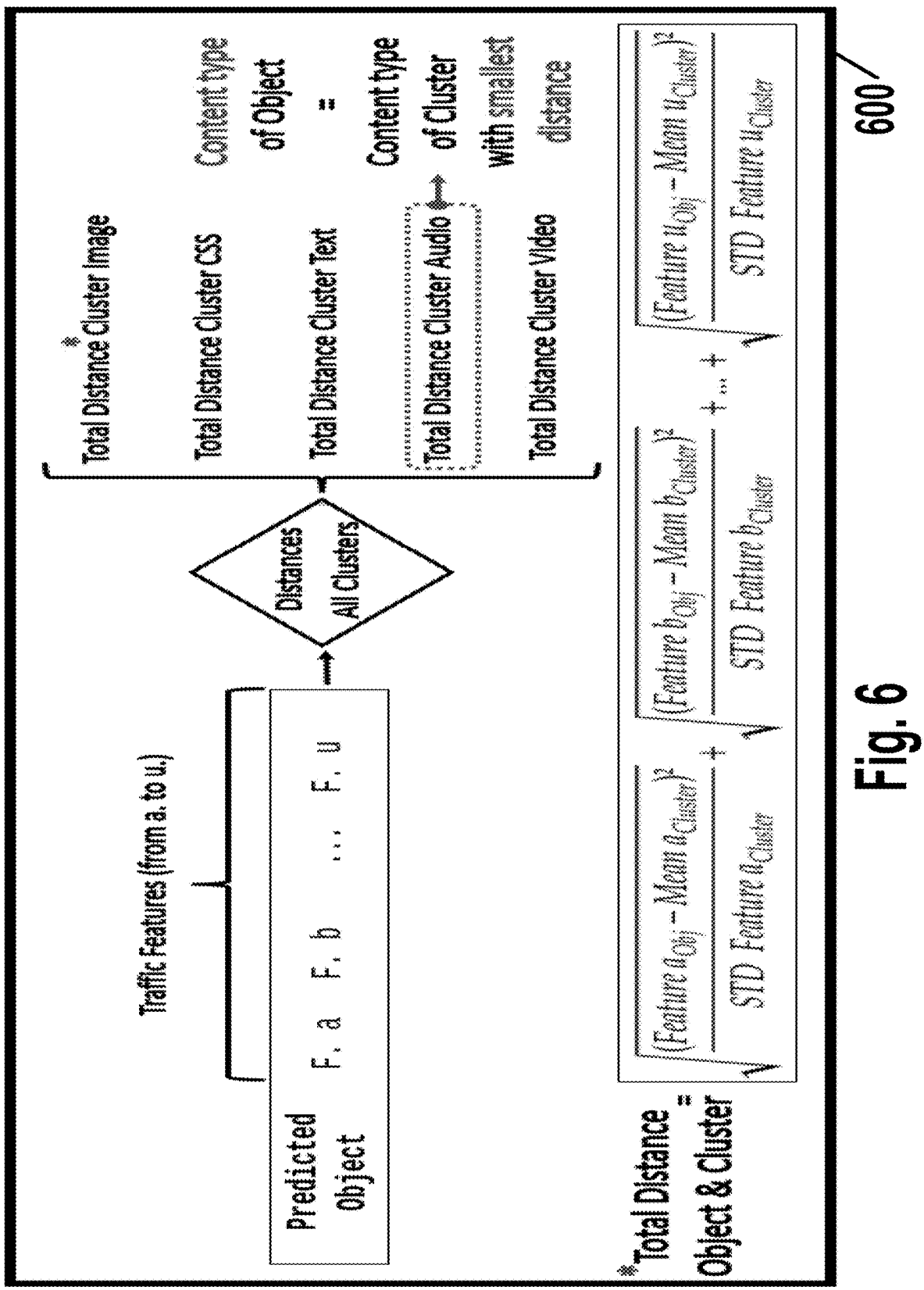
FIG. 6 is a schematic illustration demonstrating a set of objects and their respective content-based clusters, as may be generated and utilized in accordance with some embodiments.

Reference is made to FIG. 6, which is a schematic illustration demonstrating a set 600 of objects and their respective content-based clusters, as may be generated and utilized in accordance with some embodiments. In order to find the content type of one particular detected object, the system firstly calculates the traffic features of that object. Then, the system calculates the Mahalanobis distance of each traffic features of that object, relative to the average value of that traffic variable in each cluster. The system utilizes the Mahalanobis distance because it takes into account the standard deviation of the variable in the cluster, and this may thus to reduce the distance when the standard deviation of the variable in a cluster is very large. The total distance of the object between (or, relative to) one cluster is the sum of the Mahalanobis distances of all the traffic variables. Based on the total distances of that particular object and all the initial clusters, the content type assigned to the object will be the content type of the cluster with the smallest total distance. For example, the total distance of the object relative to the Video cluster, the total distance of that object relative to the Audio cluster, the total distance of that object relative to the Text cluster, and so forth, are calculated for that object relative to each one of the nine content-type clusters (in the example of nine classes); and the cluster to which the object has the smallest total distance (e.g., the Audio cluster in the depicted illustration) is the cluster whose type is assigned to that object, such that this object would now be labeled an Audio object.

In some embodiments, the Total Distance of a particular object, from (or relative to) a particular cluster of content type, may be calculated by using the following demonstrative formula:

$$\sqrt{\frac{(\text{Feature } a_{Obj} - \text{Mean } a_{Cluster})^2}{STD \text{ Feature } a_{Cluster}}} + \sqrt{\frac{(\text{Feature } b_{Obj} - \text{Mean } b_{Cluster})^2}{STD \text{ Feature } b_{Cluster}}} + \ldots + \sqrt{\frac{(\text{Feature } u_{Obj} - \text{Mean } u_{Cluster})^2}{STD \text{ Feature } u_{Cluster}}}$$

The classification of a detected object based on its Application Type may be generally similar to the content type specification, but utilizes an initial database of examples that are pre-labeled by the application (e.g., the server-side application) that is associated with each exemplary object. Then, for each detected object, there is a list of traffic features (as described above) and also an application tag indicating a particular application, for example, out of the top 1,000,000 or the top 500,000 most-common or most-used or most-popular applications as ranked by an applications ranking service (e.g., Alexa ranking). These objects are used in a K-means clustering process to generate object clusters, such that all the objects in the same cluster are objects that belong to the same application. Since these clusters are created with a K-means algorithm that uses the traffic features as the input variables, they are groups of objects belonging to the same application and also with very similar traffic features.

For example, in order to find the source application of one object that was detected or predicted, firstly the system calculates the traffic features of that object. Then, it calculates the Mahalanobis distance of each traffic feature of that object, relative to the average value of that variable in each cluster. The total distance of the object between (or, relative to) one cluster is the sum of the Mahalanobis distances of all the traffic features. Having the total distances of one object and all the initial clusters, the application assigned to the object will be the application of the cluster with smallest total distance.

Figure 7:
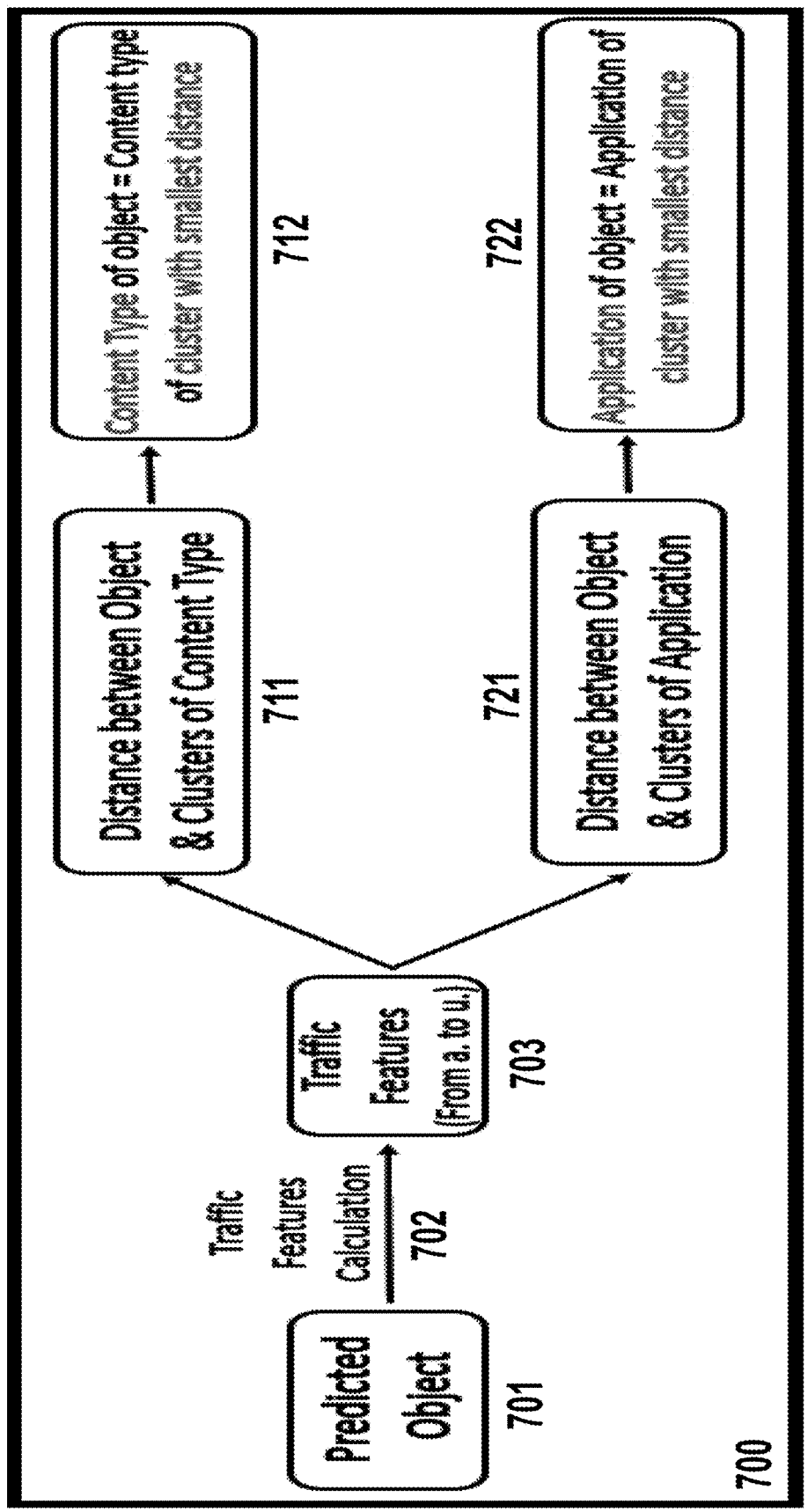
FIG. 7 is a schematic illustration demonstrating a flow of operations of object classification, in accordance with some demonstrative embodiments.

Reference is made to FIG. 7, which is a schematic illustration demonstrating a flow of operations of object classification, in accordance with some demonstrative embodiments. For each detected or predicted object (701) in the HTTPS connection, traffic features are calculated (702); such that traffic features (a) through (u) mentioned above are generated (703) for each detected object.

Then, in the upper branch of operations, the system calculates the Mahalanobis distance between the traffic features of the object and the average features of each Content Type cluster (711); and the Content Type cluster to which the object has the smallest total distance is selected as the suitable Content Type for that object (712), and this object is labeled with that Content Type.

Similarly, in parallel or concurrently or in series, the system calculates the Mahalanobis distance between the traffic features of the object and the average features of each Application Type cluster (721); and the Application Type cluster to which the object has the smallest total distance is selected as the suitable Application Type for that object (722), and this object is labeled with that Application Type.

Figure 8:
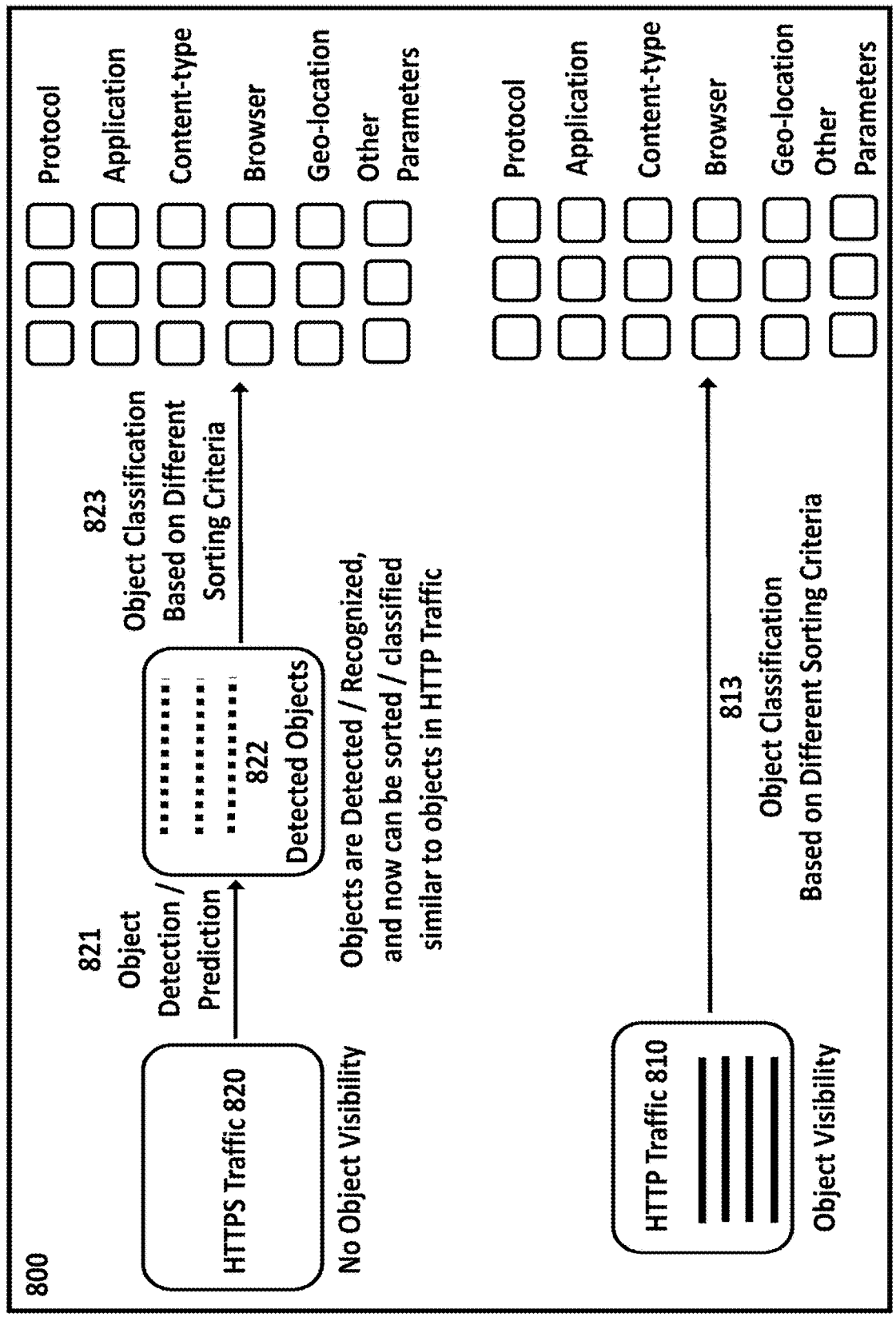
FIG. 8 is a schematic illustration demonstrating a flow of operations of HTTP and HTTPS object classification, in accordance with some demonstrative embodiments.

Reference is made to FIG. 8, which is a schematic illustration demonstrating a flow of operations of HTTP and HTTPS object classification, in accordance with some demonstrative embodiments. For example, HTTP traffic 810 is monitored and captured; since it has object visibility, object classification (813) may be directly performed, based on one or more or different sorting criteria or classification criteria. In contrast, HTTPS traffic 820, as monitored and captured, is encrypted and inherently has no object visibility; therefore, an Object Prediction/Detection process (821) is performed, to result in Detected Objects (822); and the detected or recognized objects can now be sorted/classified, similar to the objects that are visible within an HTTP connection; and accordingly, object classification (823) is now performed on the detected HTTPS objects, based on different sorting criteria or clustering criteria or classification criteria. In both cases, the sorting or classification may be based on one or more parameters or object-related properties, for example, application (or application type), protocol (or protocol type), content type, browser type, geo-location data of the end-user device, and/or other suitable parameters or properties.

It is noted that various disadvantages or problems that had characterized some conventional systems for traffic classification, particularly those that attempted to classify HTTP traffic, do not pose an obstacle to embodiments of the present invention, or that some embodiments of the present invention may solve or overcome or avoid.

For example, some conventional systems had attempted to use port-based classification of traffic, assuming that each communication port is associated with one particular application. The Applicants have realized that port-based classification is often unreliable, as many applications use non-standard ports, or may select a random or pseudo-random port at startup, or may hide themselves behind ports of their protocols. It is noted that the unknown relationship between ports and current applications is not an obstacle for embodiments of the present invention, as the proposed system is not dependent on (and does not rely on, and does not take into account) the port of the HTTPS connection being analyzed.

The Applicants have also realized that some conventional payload-based classification systems had attempted to inspect the content of packets, searching for particular keywords or strings that are distinctive of a particular application or a particular type of server. The Applicants have realized that such payload inspection may only be applied with regard to HTTP traffic, and not with regard to encrypted/HTTPS traffic or packets or payload. In contrast, embodiments of the present invention overcome this drawback as they operate on (or with) HTTPS objects with total autonomy from their content, and without the need to decrypt or analyze the content itself, and without the need to have access to the payload itself in its non-encrypted form. The unique patterns that the proposed system associates with each category or class of traffic, are not regular expressions or keywords, but rather, they are based on traffic measurements and statistic records.

Embodiments of the present invention do not apply the ML/DL/AI/SMA model to an entire Communication Flow level of encrypted traffic, but rather, to the Object level of encrypted traffic and after discrete objects have been detected or extracted from the HTTPS flow based on ML/DL/AI/SMA analysis. Some embodiments may thus achieve a higher level of classification accuracy, relative to coarse-grained classification that Flow level analysis attempts to achieve (e.g., coarse-grained classification of P2P traffic versus non-P2P traffic, or HTTP traffic versus Streaming traffic). Conventional classification systems did not achieve classification of encrypted/HTTPS traffic on Application Type basis, with granularity that can reach thousands or even tens-of-thousands (or more) of specific Applications. The system of some embodiments performs an initial phase of searching and detecting discrete Objects inside each HTTPS connection; and then, based on the extraction of these detected objects, it is also possible to perform the fine-grained classification of content type and application type per object, because the traffic measures of individual objects (that were detected in the HTTPS connection) provide valuable patterns of specific applications or groups of applications (and not only groups of protocols).

Some embodiments of the present invention do not attempt to perform behavioral classification of traffic based on the entirety of the traffic that is received by a host, and do not attempt to find a pattern in the entire traffic for recognizing the class of application that is running on that host. Rather, some embodiments of the present invention may analyze the entire communication flow or HTTPS connection, but the patterns that are used to identify the traffic category or for classification purposes are inside the identified objects that are detected in each HTTPS connection, enabling a high-granularity classification of objects and thus of HTTPS connections and HTTPS traffic, and enabling to perform such classification at any suitable segment or location or node of the communication network, including (but not limited to) possibly being deployed directly in the core network.

Some embodiments may similarly utilize the above-described processes, methods, components, units and/or models in order to perform classification and/or categorization and/or clustering of HTTPS traffic or payload or content or packets or flows or streams, and/or non-encrypted HTTP traffic or payload or content or packets or flows or streams, and/or encrypted HTTP traffic or payload or content or packets or flows or streams. In some embodiments, for example, classification and/or categorization and/or clustering of non-encrypted (or even encrypted) HTTP traffic or objects may utilize a similar ML/DL/AI/SMA model; such as, replacing the first ML/DL/AI/SMA model described above with a unit or a process that performs object-detection or classification or categorization or clustering based on: content type, server-side application type, client-side application type, server's IP address, server geo-location data (e.g., derived from the server IP address), user type or user-side data or indicators (e.g., user-agent string, user's Operating System type or version, user's browser type or version, or other user data), bitrate, type of protocol being used, and/or other parameters.

In some embodiments, a system comprises: (a) a Traffic Monitoring Unit, to monitor network traffic, and to capture HTTPS-encrypted packets that are exchanged over an HTTPS connection between an end-user device and a web server; (b) an HTTPS Traffic Classification Unit, to detect discrete HTTPS-encrypted objects within said HTTPS connection, and to classify said discrete HTTPS-encrypted objects based on at least one of: a first Analysis Model that classifies HTTPS-encrypted objects based on a type of content that is represented in said HTTPS-encrypted object, by using at least one of: Machine Learning (ML), Deep Learning (DL), Artificial Intelligence (AI), Statistical and Mathematical Analysis (SMA); a second Analysis Model that classifies HTTPS-encrypted objects based on a type of server-side application that is associated with said HTTPS-encrypted object, by using at least one of: Machine Learning (ML), Deep Learning (DL), Artificial Intelligence (AI), Statistical and Mathematical Analysis (SMA).

In some embodiments, the system comprises: an HTTP Traffic Classification Unit, to analyze HTTP packets that are exchanged over an HTTP connection between said end-user device and said web server, to detect discrete HTTP objects within said HTTP connection, and to classify said discrete HTTP objects based on an analysis model which utilizes at least one of: Machine Learning (ML), Deep Learning (DL), Artificial Intelligence (AI), Statistical and Mathematical Analysis (SMA, and which classifies HTTP objects based on at least one of: content type, server-side application type, client-side application type, Internet Protocol (IP) address of said serve, geo-location data of said server, user type, bitrate, type of protocol being used.

In some embodiments, the system comprises: an HTTPS Objects Labeling Unit, to label a particular HTTPS object, that is detected said HTTPS connection, with a content-type label that indicates a content type of said particular HTTPS object, and with an application-type label that indicates a server-side application type that is associated with said particular HTTPS object.

In some embodiments, the system comprises: a Traffic Handling Unit, to select a traffic handling rule based on at least one of: (i) the content-type label of said particular HTTPS object, (ii) the application-type label of said particular HTTPS object; and to enforce said traffic handling rule on at least one of: (i) said particular HTTPS object, (ii) packets of the HTTPS connection that includes said HTTPS object.

In some embodiments, the system comprises: a Transport Layer Security (TLS) Handshake Finish Detector Unit, configured: (I) to apply a Machine Learning (ML) analysis to HTTPS-encrypted packets of said HTTPS connection; (II) based on said ML analysis, to determine that a particular portion of the HTTPS-encrypted packets of said HTTPS connection represents a TLS Handshake Finish message.

In some embodiments, the system comprises: the TLS Handshake Finish Detector Unit is further configured: (III) to separate the HTTPS-encrypted packets of said HTTPS connection into: (i) a first group of HTTPS-encrypted packets that precede the TLS Handshake Finish message, and (ii) a second group HTTPS-encrypted packets that followed the TLS Handshake Finish message.

In some embodiments, the system comprises: an HTTP Version Detector Unit (or, an HTTPS Version Detector Unit), configured to receive said first group of HTTPS-encrypted packets that precede the TLS Handshake Finish message, and to perform on said first group a statistical analysis that generates an HTTP Version Determination which indicates whether said HTTPS connection is (I) in accordance with HTTP/1.x protocol or is (II) in accordance with HTTP/2 protocol.

In some embodiments, the system comprises: an HTTPS-encrypted Objects Detector, configured to perform analysis on packets of said HTTPS connection by using at least one of a Machine Learning (ML) model, a Deep Learning (DL) model, an Artificial Intelligence (AI) model, a Statistical and Mathematical Model SMA), and to determine a number of discrete HTTPS-encrypted objects that are included in said HTTPS connection.

In some embodiments, the HTTPS-encrypted Objects Detector is further configured to perform analysis of traffic-related features of said HTTPS-encrypted packets by using at least one of a Machine Learning (ML) model, a Deep Learning (DL) model, an Artificial Intelligence (AI) model, a Statistical and Mathematical Model SMA), and to generate a determination indicating which particular HTTPS-encrypted packets of said HTTPS connection correspond to each particular HTTPS-encrypted object.

In some embodiments, the system comprises: the HTTPS-encrypted Objects Detector utilizes a Long Short-Term Memory (LSTM) recurrent neural network (RNN) to perform multivariate time series classification of said HTTPS-encrypted packets of said HTTPS connection and to generate results indicating (i) the number of discrete HTTPS-encrypted objects that are included in said HTTPS connection and (ii) the HTTPS-encrypted that correspond to each of said discrete HTTPS-encrypted objects; wherein said LSTM recurrent neural network (RNN) performs HTTPs object detection by taking into account spatial information of previously-detected objects from other HTTPS connections.

In some embodiments, the system comprises: a Features Extractor Unit, configured to extract, for each particular HTTPS-encrypted object that was detected by the HTTPS-encrypted Objects Detector, a set of traffic-related features; an ML-based HTTPS-encrypted Object Classification Unit, configured to apply an ML-based analysis on said set of traffic-related features of a particular HTTPS-encrypted object, and to generate an analysis result that classifies said particular HTTPS-encrypted object based on at least one of: content-type of the HTTPS-encrypted object, server-side application type of the HTTPS-encrypted object.

In some embodiments, the set of traffic-related features that are used by the ML-based HTTPS-encrypted Object Classification Unit comprises at least: (a) a minimum packet length in a client-to-server direction; (b) a maximum packet length in the client-to-server direction; (c) an average packet length in the client-to-server direction; (d) a standard deviation of packet length in the client-to-server direction; (e) a minimum packet length in a server-to- client direction; (f) a maximum packet length in the server-to-client direction; (g) an average packet length in the server-to-client direction; (h) a standard deviation of packet length in the server-to-client direction.

In some embodiments, additionally or alternatively, the set of traffic-related features that are used by the ML-based HTTPS-encrypted Object Classification Unit comprises at least: (i) a minimum inter-arrival time of packets in the client-to-server direction; (j) a maximum inter-arrival time of packets in the client-to-server direction; (k) an average inter-arrival time of packets in the client-to-server direction;

(l) a standard deviation of inter-arrival time of packets in the client-to-server direction; (m) a minimum inter-arrival time of packets in the server-to-client direction; (n) a maximum inter-arrival time of packets in the server-to-client direction; (o) an average inter-arrival time of packets in the server-to-client direction; (p) a standard deviation of inter-arrival time of packets in the server-to-client direction.

In some embodiments, additionally or alternatively, the set of traffic-related features that are used by the ML-based HTTPS-encrypted Object Classification Unit comprises at least: (q) a total number of bytes in the client-to-server direction; (r) a total number of packets in the client-to-server direction; (s) a total number of bytes in the server-to-client direction; (t) a total number of packets in the server-to-client direction; (u) a total time duration of a flow of the HTTPS-encrypted packets of said HTTPS-encrypted object.

In some embodiments, the system comprises: an HTTPS-encrypted Object Clustering Unit, configured to perform clustering of a particular HTTPS-encrypted object into exactly one content-type cluster out of a plurality of existing content-type clusters, wherein each existing content-type cluster corresponds to HTTPS-encrypted objects that are known to belong to a particular content-type.

In some embodiments, the HTTPS-encrypted Object Clustering Unit comprises a Smallest Distance Finder Unit that is configured to calculate a Mahalanobis distance between (I) each traffic-related feature of the particular HTTPS-encrypted object, and (II) an average value of corresponding values of said traffic-related feature of each existing content-type cluster; and is further configured to select the existing content-type cluster associated with a shortest Mahalanobis distance relative to said particular HTTPS-encrypted object.

In some embodiments, the system comprises: an HTTPS-encrypted Object Clustering Unit, configured to perform clustering of a particular HTTPS-encrypted object into exactly one application-type cluster out of a plurality of existing application-type clusters, wherein each existing application-type cluster corresponds to HTTPS-encrypted objects that are known to belong to a particular server-side application.

In some embodiments, the HTTPS-encrypted Object Clustering Unit comprises a Smallest Distance Finder Unit that is configured to calculate a Mahalanobis distance between (I) each traffic-related feature of the particular HTTPS-encrypted object, and (II) an average value of corresponding values of said traffic-related feature of each existing content-type cluster; and is further configured to select the existing content-type cluster associated with a shortest Mahalanobis distance relative to said particular HTTPS-encrypted object.

In some embodiments, the HTTPS Traffic Classification Unit is configured to classify said discrete HTTPS-encrypted objects based on at least one of: content type, server-side application type, client-side application type, Internet Protocol (IP) address of said server, geo-location data of said server, user type, bitrate, type of protocol being used.

In some embodiments, a method comprises: (a) monitoring network traffic, and capturing HTTPS-encrypted packets that are exchanged over an HTTPS connection between an end-user device and a web server; (b) performing HTTPS Traffic Classification Unit, by detecting discrete HTTPS-encrypted objects within said HTTPS connection, and by classifying said discrete HTTPS-encrypted objects based on at least one of: a first Analysis Model that classifies HTTPS-encrypted objects based on a type of content that is represented in said HTTPS-encrypted object, by using at least one of: Machine Learning (ML), Deep Learning (DL), Artificial Intelligence (AI), Statistical and Mathematical Analysis (SMA); a second Analysis Model that classifies HTTPS-encrypted objects based on a type of server-side application that is associated with said HTTPS-encrypted object, by using at least one of: Machine Learning (ML), Deep Learning (DL), Artificial Intelligence (AI), Statistical and Mathematical Analysis (SMA).

Some embodiments comprise a non-transitory storage medium having stored thereon instructions that, when executed by one or more hardware processors, cause the one or more hardware processors to perform a method as described above.

In accordance with some embodiments, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process (es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a legend list or a database of possible values or ranges; a comparison or matching or searching process which searches for matches and/or identical results and/or similar results among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments, may be combined with, or may be utilized in combination with, one or more other functions, operations, components and/or features described herein with reference to one or more other embodiments. Some embodiments may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments have been illustrated and described herein, various modifications, substitutions, changes, and equivalents may occur to those skilled in the art. Accordingly, the claims are intended to cover all such modifications, substitutions, changes, and equivalents.

What is claimed is:

1. A system comprising:
   (a) a Traffic Monitoring Unit, to monitor network traffic, and to capture HTTPS-encrypted packets that are exchanged over an HTTPS connection between an end-user device and a web server;
   (b) an HTTPS Traffic Classification Unit,
   to detect discrete HTTPS-encrypted objects within said HTTPS connection, and to classify said discrete HTTPS-encrypted objects based on at least one of:
a first Analysis Model that classifies HTTPS-encrypted objects based on a type of content that is represented in said HTTPS-encrypted object, by using at least one of: Machine Learning (ML), Deep Learning (DL), Artificial Intelligence (AI), Statistical and Mathematical Analysis (SMA);
a second Analysis Model that classifies HTTPS-encrypted objects based on a type of server-side application that is associated with said HTTPS-encrypted object, by using at least one of: Machine Learning (ML), Deep Learning (DL), Artificial Intelligence (AI), Statistical and Mathematical Analysis (SMA);
(c) an HTTPS Objects Labeling Unit, to label a particular HTTPS object, that is detected said HTTPS connection, with a content-type label that indicates a content type of said particular HTTPS object, and with an application-type label that indicates a server-side application type that is associated with said particular HTTPS object;
(d) a Transport Layer Security (TLS) Handshake Finish Detector Unit, configured:
  (I) to apply a Machine Learning (ML) analysis to HTTPS-encrypted packets of said HTTPS connection; and
  (II) based on said ML analysis, to determine that a particular portion of the HTTPS-encrypted packets of said HTTPS connection represents a TLS Handshake Finish message; and
  (III) to separate the HTTPS-encrypted packets of said HTTPS connection into:
    (i) a first group of HTTPS-encrypted packets that precede the TLS Handshake Finish message, and (ii) a second group HTTPS-encrypted packets that followed the TLS Handshake Finish message;
(e) an HTTP Version Detector Unit, configured to receive said first group of HTTPS-encrypted packets that precede the TLS Handshake Finish message, and to perform on said first group a statistical analysis that generates an HTTP Version Determination which indicates whether said HTTPS connection is (I) in accordance with HTTP/1.x protocol or is (II) in accordance with HTTP/2 protocol;
(f) an HTTPS-encrypted Objects Detector, configured to perform analysis on packets of said HTTPS connection by using at least one of a Machine Learning (ML) model, a Deep Learning (DL) model, an Artificial Intelligence (AI) model, a Statistical and Mathematical Model SMA), and to determine a number of discrete HTTPS-encrypted objects that are included in said HTTPS connection;
wherein the HTTPS-encrypted Objects Detector utilizes a Long Short-Term Memory (LSTM) recurrent neural network (RNN) to perform multivariate time series classification of said HTTPS-encrypted packets of said HTTPS connection and to generate results indicating (i) the number of discrete HTTPS-encrypted objects that are included in said HTTPS connection and (ii) the HTTPS-encrypted that correspond to each of said discrete HTTPS-encrypted objects; wherein said LSTM recurrent neural network (RNN) performs HTTPs object detection by taking into account spatial information of previously-detected objects from other HTTPS connections;
(g) a Features Extractor Unit, configured to extract, for each particular HTTPS-encrypted object that was detected by the HTTPS-encrypted Objects Detector, a set of traffic-related features;
(h) an ML-based HTTPS-encrypted Object Classification Unit, configured to apply an ML-based analysis on said set of traffic-related features of a particular HTTPS-encrypted object, and to generate an analysis result that classifies said particular HTTPS-encrypted object based on at least one of: content-type of the HTTPS-encrypted object, server-side application type of the HTTPS-encrypted object;
(i) an HTTPS-encrypted Object Clustering Unit, configured to perform clustering of a particular HTTPS-encrypted object into exactly one content-type cluster out of a plurality of existing content-type clusters, wherein each existing content-type cluster corresponds to HTTPS-encrypted objects that are known to belong to a particular content-type.
wherein at least one component of the system is implemented by a hardware processor which is comprised in said system.

2. The system of claim 1,
wherein the set of traffic-related features that are used by the ML-based HTTPS-encrypted Object Classification Unit comprises at least:
  (a) a minimum packet length in a client-to-server direction;
  (b) a maximum packet length in the client-to-server direction;
  (c) an average packet length in the client-to-server direction;
  (d) a standard deviation of packet length in the client-to-server direction;
  (e) a minimum packet length in a server-to-client direction;
  (f) a maximum packet length in the server-to-client direction;
  (g) an average packet length in the server-to-client direction;
  (h) a standard deviation of packet length in the server-to-client direction.

3. The system of claim 2,
wherein the set of traffic-related features that are used by the ML-based HTTPS-encrypted Object Classification Unit further comprises at least:
  (i) a minimum inter-arrival time of packets in the client-to-server direction;
  (j) a maximum inter-arrival time of packets in the client-to-server direction;
  (k) an average inter-arrival time of packets in the client-to-server direction;
  (l) a standard deviation of inter-arrival time of packets in the client-to-server direction;
  (m) a minimum inter-arrival time of packets in the server-to-client direction;
  (n) a maximum inter-arrival time of packets in the server-to-client direction;
  (o) an average inter-arrival time of packets in the server-to-client direction;
  (p) a standard deviation of inter-arrival time of packets in the server-to-client direction.

4. The system of claim 3,
wherein the set of traffic-related features that are used by the ML-based HTTPS-encrypted Object Classification Unit further comprises at least:
  (q) a total number of bytes in the client-to-server direction;

(r) a total number of packets in the client-to-server direction;
(s) a total number of bytes in the server-to-client direction;
(t) a total number of packets in the server-to-client direction;
(u) a total time duration of a flow of the HTTPS-encrypted packets of said HTTPS-encrypted object.

5. The system of claim 1, comprising:
an HTTP Traffic Classification Unit,
to analyze HTTP packets that are exchanged over an HTTP connection between said end-user device and said web server,
to detect discrete HTTP objects within said HTTP connection,
and to classify said discrete HTTP objects based on an analysis model which utilizes at least one of: Machine Learning (ML), Deep Learning (DL), Artificial Intelligence (AI), Statistical and Mathematical Analysis (SMA, and which classifies HTTP objects based on at least one of: content type, server-side application type, client-side application type, Internet Protocol (IP) address of said serve, geo-location data of said server, user type, bitrate, type of protocol being used.

6. The system of claim 1, comprising:
a Traffic Handling Unit, to select a traffic handling rule based on at least one of: (i) the content-type label of said particular HTTPS object, (ii) the application-type label of said particular HTTPS object;
and to enforce said traffic handling rule on at least one of:
(i) said particular HTTPS object, (ii) packets of the HTTPS connection that includes said HTTPS object.

7. The system of claim 1,
wherein the HTTPS-encrypted Objects Detector is further configured to perform analysis of traffic-related features of said HTTPS-encrypted packets by using at least one of a Machine Learning (ML) model, a Deep Learning (DL) model, an Artificial Intelligence (AI) model, a Statistical and Mathematical Model SMA), and to generate a determination indicating which particular HTTPS-encrypted packets of said HTTPS connection correspond to each particular HTTPS-encrypted object.

8. The system of claim 1,
wherein the HTTPS-encrypted Object Clustering Unit comprises a Smallest Distance Finder Unit that is configured to calculate a Mahalanobis distance between (I) each traffic-related feature of the particular HTTPS-encrypted object, and (II) an average value of corresponding values of said traffic-related feature of each existing content-type cluster; and is further configured to select the existing content-type cluster associated with a shortest Mahalanobis distance relative to said particular HTTPS-encrypted object.

9. A system comprising:
(a) a Traffic Monitoring Unit, to monitor network traffic, and to capture HTTPS-encrypted packets that are exchanged over an HTTPS connection between an end-user device and a web server;
(b) an HTTPS Traffic Classification Unit,
to detect discrete HTTPS-encrypted objects within said HTTPS connection, and to classify said discrete HTTPS-encrypted objects based on at least one of:
a first Analysis Model that classifies HTTPS-encrypted objects based on a type of content that is represented in said HTTPS-encrypted object, by using at least one of: Machine Learning (ML), Deep Learning (DL), Artificial Intelligence (AI), Statistical and Mathematical Analysis (SMA);
a second Analysis Model that classifies HTTPS-encrypted objects based on a type of server-side application that is associated with said HTTPS-encrypted object, by using at least one of: Machine Learning (ML), Deep Learning (DL), Artificial Intelligence (AI), Statistical and Mathematical Analysis (SMA);
(c) an HTTPS Objects Labeling Unit, to label a particular HTTPS object, that is detected said HTTPS connection, with a content-type label that indicates a content type of said particular HTTPS object, and with an application-type label that indicates a server-side application type that is associated with said particular HTTPS object;
(d) a Transport Layer Security (TLS) Handshake Finish Detector Unit, configured:
(I) to apply a Machine Learning (ML) analysis to HTTPS-encrypted packets of said HTTPS connection; and
(II) based on said ML analysis, to determine that a particular portion of the HTTPS-encrypted packets of said HTTPS connection represents a TLS Handshake Finish message; and
(III) to separate the HTTPS-encrypted packets of said HTTPS connection into:
(i) a first group of HTTPS-encrypted packets that precede the TLS Handshake Finish message, and (ii) a second group HTTPS-encrypted packets that followed the TLS Handshake Finish message;
(e) an HTTP Version Detector Unit, configured to receive said first group of HTTPS-encrypted packets that precede the TLS Handshake Finish message, and to perform on said first group a statistical analysis that generates an HTTP Version Determination which indicates whether said HTTPS connection is (I) in accordance with HTTP/1.x protocol or is (II) in accordance with HTTP/2 protocol;
(f) an HTTPS-encrypted Objects Detector, configured to perform analysis on packets of said HTTPS connection by using at least one of a Machine Learning (ML) model, a Deep Learning (DL) model, an Artificial Intelligence (AI) model, a Statistical and Mathematical Model SMA), and to determine a number of discrete HTTPS-encrypted objects that are included in said HTTPS connection;
wherein the HTTPS-encrypted Objects Detector utilizes a Long Short-Term Memory (LSTM) recurrent neural network (RNN) to perform multivariate time series classification of said HTTPS-encrypted packets of said HTTPS connection and to generate results indicating (i) the number of discrete HTTPS-encrypted objects that are included in said HTTPS connection and (ii) the HTTPS-encrypted that correspond to each of said discrete HTTPS-encrypted objects; wherein said LSTM recurrent neural network (RNN) performs HTTPs object detection by taking into account spatial information of previously-detected objects from other HTTPS connections;
(g) a Features Extractor Unit, configured to extract, for each particular HTTPS-encrypted object that was detected by the HTTPS-encrypted Objects Detector, a set of traffic-related features;
(h) an ML-based HTTPS-encrypted Object Classification Unit, configured to apply an ML-based analysis on said set of traffic-related features of a particular HTTPS-encrypted object, and to generate an analysis result that classifies said particular HTTPS-encrypted object based on at least one of: content-type of the HTTPS-encrypted object, server-side application type of the HTTPS-encrypted object;

(i) an HTTPS-encrypted Object Clustering Unit, configured to perform clustering of a particular HTTPS-encrypted object into exactly one application-type cluster out of a plurality of existing application-type clusters, wherein each existing application-type cluster corresponds to HTTPS-encrypted objects that are known to belong to a particular server-side application;

wherein at least one component of the system is implemented by a hardware processor which is comprised in said system.

10. The system of claim 9, wherein the HTTPS-encrypted Object Clustering Unit comprises a Smallest Distance Finder Unit that is configured to calculate a Mahalanobis distance between (I) each traffic-related feature of the particular HTTPS-encrypted object, and (II) an average value of corresponding values of said traffic-related feature of each existing content-type cluster; and is further configured to select the existing content-type cluster associated with a shortest Mahalanobis distance relative to said particular HTTPS-encrypted object.

11. The system of claim 9, wherein the HTTPS Traffic Classification Unit is configured to classify said discrete HTTPS-encrypted objects based on at least one of:

content type,
server-side application type,
client-side application type,
Internet Protocol (IP) address of said server,
geo-location data of said server,
user type,
bitrate,
type of protocol being used.

* * * * *